No. 765,400. PATENTED JULY 19, 1904.
E. K. REA.
CORN HARVESTER, &c.
APPLICATION FILED OCT. 6, 1902.
NO MODEL.
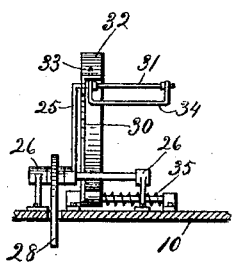
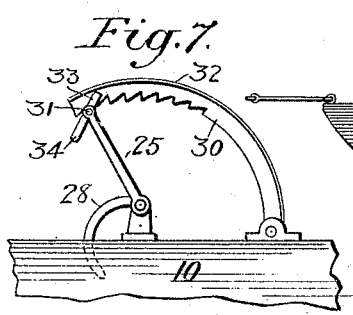
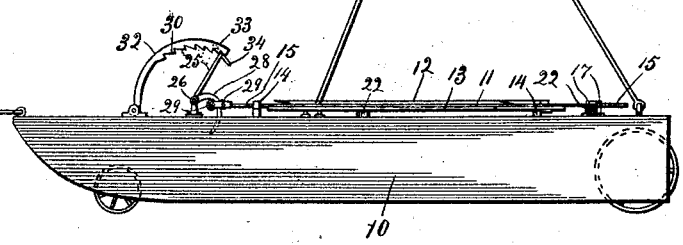
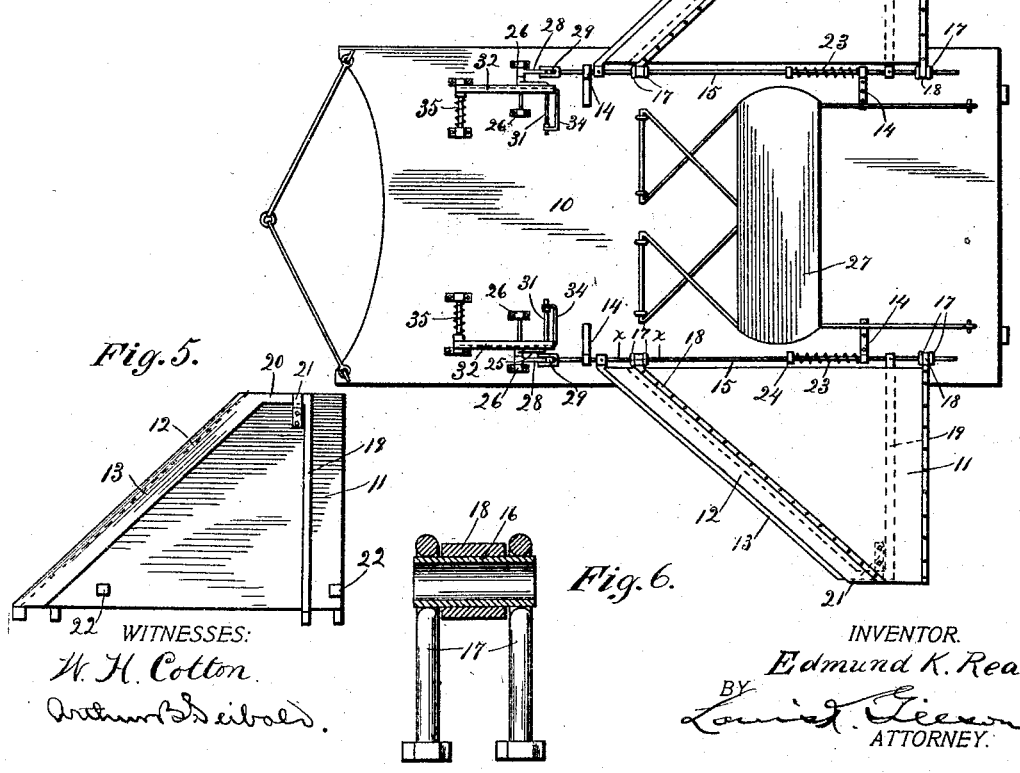
WITNESSES:
W. H. Cotton
Arthur B Seibold
INVENTOR.
Edmund K. Rea.
BY
Louis T. Gieson
ATTORNEY.

No. 765,400.

Patented July 19, 1904.

UNITED STATES PATENT OFFICE.

EDMUND K. REA, OF OVID, MISSOURI.

CORN-HARVESTER, &c.

SPECIFICATION forming part of Letters Patent No. 765,400, dated July 19, 1904.

Application filed October 6, 1902. Serial No. 126,084. (No model.)

*To all whom it may concern:*

Be it known that I, EDMUND K. REA, a citizen of the United States, and a resident of Ovid, county of Ray, and State of Missouri, have invented certain new and useful Improvements in Corn-Harvesters and Like Machines, of which the following is a specification, and which are illustrated in the accompanying drawings, forming a part threeof.

This invention relates to a movable guard for the knife or cutter-bar of a corn-harvester or like agricultural machine and which is adapted to be held normally in advance or in front of the knife to avoid the cutting of the attendant should he step or fall in front of the knife while the machine is in motion.

In an application for patent of even date I have claimed the invention broadly, while in the present case it is aimed to cover a species of the invention, in the embodiment of which I employ a stationary knife or cutter-bar and a guard held normally in advance of the knife, but capable of being retracted to expose the knife by a connection operated by the attendant and upon the release of which the guard is automatically advanced to its original and normal position.

The invention consists of the combination and arrangement of parts hereinafter fully described, particularly pointed out in the claims, and illustrated in the accompanying drawings, in which—

Figure 1 is a side elevation of a corn-harvester of ordinary construction having the movable cutter-guard adapted thereto. Fig. 2 is a plan of the same. Fig. 3 is a detail of the mechanism for retracting the guard when it is desired to put the harvester into action. Fig. 4 is a section on the line $y\ y$ of Fig. 2. Fig. 5 is a bottom view of one of the leaves or wings of the harvester illustrated in Figs. 1 and 2, the guard being shown attached. Fig. 6 is a section on the line $x\ x$ of Fig. 2; and Fig. 7 is a detail of certain parts of the machine drawn upon a larger scale than the other figures.

In the drawings the invention is illustrated as adapted to a corn-harvester of ordinary construction, consisting of a wheel or runner supported platform 10, provided with a hinged leaf or wing 11, extending from each side thereof, furnished with a knife or cutter-bar 12 secured to its forward end. The harvester shown is adapted to the cutting of two rows of corn, and a guard is provided for each knife; but as the mechanism for both is the same a description of the parts at one side of the harvester will answer for both. The leaf or wing 11 may be hinged to the platform, as is usual with such machines. The guard 13, which is designed to be held normally in advance of the cutter, in order to prevent injury to the attendant in case he steps in front of the knife while the harvester is in motion or moves against its cutter, may be supported and operated in any preferred manner. As shown, the guard is located under the leaf or wing 11 and normally projects in front of the cutting edge of the knife. Extending parallel with the side of the platform 10 and passing through guides 14, secured to the platform, is a sliding rod 15, which may also pass through the alined tubular sections 16, fastened by eyebolts 17 to the platform and on which the hinges 18 of the leaf 11 are pivoted. The inner end of the guard 13 is secured to the rod 15, and the outer end may also be attached thereto to brace or strengthen the same by a bar 19, the outer end of which may, as at 20, be extended parallel to the direction of movement of the guard and pass through an eye 21, by which the outer end of the guard is supported and guided. The leaf 11 is provided with bosses 22, which when the leaf is down rest upon the side of the platform, thereby providing a space between the latter and the leaf to enable the guard to slide freely when the rod 15 is moved.

The guard 13 is held or maintained in its advanced position, so as to project beyond the edge of the knife, by an expansion-spring 23, reaching between a shoulder 24 on the rod 15 and the rear of the guides 14, through which the rod slides.

Any suitable mechanism may be provided for retracting the guard to expose the knife when it is desired to put the machine into action. I have shown a foot-lever 25 for accomplishing this result, such lever being pivoted on the platform, as at 26, and extending upwardly within reach of the attendant occupying the seat 27. This lever is provided with a cam, which in the present instance takes the form of a rearwardly and downwardly curved bar 28, which passes between a pair of friction-rollers 29, journaled to the front end of the slide-rod 15.

When it is desired to put the machine into action, the pressure of the attendant's foot on the lever 25 will turn the cam, which acting against the rear one of the friction-rollers 29 will force the rod 15 back, compressing the spring 23 and carrying with it or retracting the guard 13, so that the edge of the knife will be exposed. As soon as the operator removes his foot from the lever, as when he is about to step off the platform, the spring 23 expands and returns the guard 13 to its normal position—that is to say, in advance of the knife-edge.

To assist the spring 23 in holding the guard 13 unyieldingly in its forward position to prevent its being forced back, so as to expose the knife in case pressure should be exerted against it, as if the operator were to step in front of the knife, I provide a catch or dog and ratchet mechanism, as shown in Fig. 3. Such mechanism may comprise a ratchet-bar 30, pivoted at its lower end to the platform 10 and curving rearwardly and engaged by the foot-bar acting as a pawl. This will securely hold the cam 28 against movement.

To release the cam, the ratchet-bar 30 is provided with a flange 32, adapted to be engaged by a tappet 33, fixed to a foot-piece 34, pivoted on the bar 31. The weight of the ratchet-bar 30 will move the teeth thereof against the pawl 31 and insure the engagement of the latter with said teeth when the foot-lever is released, although a spring 35, as shown, may be employed and attached to the ratchet-bar for pressing it downward, so as to engage its teeth with the pawl. When the foot is placed on the bar 31, it will also come into engagement with the pivoted piece 34, and, tilting it, raise, by means of the tappet 33, the ratchet-bar out of engagement with pawl or foot-bar 31.

I claim as my invention—

1. In a harvester, in combination, a vertically-swinging cutting-knife, a vertically-swinging guard normally in advance of the knife, a lever for retracting the guard, and means for returning the guard when the retracting means are released.

2. In a harvester, in combination, a cutting-knife, a guard normally in advance of the knife, a sliding rod to which the guard is attached, a foot-lever, a cam fixed to the lever and engaging the rod, a spring reacting against the rod in opposition to the cam, a ratchet-bar, and a pawl engaging the ratchet-bar and for locking the lever when the guard is in its normal position.

3. In a harvester, in combination, a cutting-knife, a guard normally in advance of the knife, a sliding rod to which the guard is attached, a foot-lever, a cam fixed to the lever and engaging the bar to slide the latter rearwardly, a spring acting in opposition to the cam, a pivoted ratchet-bar engaged by the lever and locking the rod against movement, and a tappet pivoted to the lever for disengaging the ratchet-bar.

4. In a harvester, in combination, a platform, a leaf hinged to and projecting from the side of the platform and carrying a knife at its front end, a guard located under the leaf and parallel with and normally in advance of the knife, a sliding rod mounted on the platform to which the inner end of the guard is attached, a rod securing the outer end of the guard to the rod, a foot-lever pivoted to the platform, a cam fixed to the lever and engaging the front end of the rod to slide it rearwardly, a spring on the rod acting in opposition to the cam, a ratchet-bar pivoted to the platform and engaging the lever for locking the rod against movement, and a tappet pivoted to the lever for disengaging the ratchet-bar.

5. In a harvester, in combination, a cutting-knife, a guard normally in advance of the knife, a sliding rod to which the guard is attached, a cam engaging the rod for sliding it rearwardly, a lever actuating the cam, a pivoted ratchet-bar engaging the lever, and a tappet pivoted to the lever for disengaging the ratchet-bar.

6. In combination with a harvester having a cutting-knife and a movable guard therefor, a foot-lever, connection between the lever and the guard, a pivoted ratchet-bar engaged by the lever, and a tappet pivoted to the lever for disengaging the ratchet-bar.

7. In a harvester, in combination, a cutting-knife, a movable guard normally in advance of the knife, means for retracting the guard, and a device for locking the guard in its advanced position.

8. In a harvester, in combination, a cutting-knife, a guard normally in advance of the knife, a lever, connection between the lever and the guard for retracting the guard, a spring for returning the guard to its normal position, and a device for automatically locking the guard when so returned.

9. In a harvester, in combination, a cutting-knife, a sliding guard normally in advance of the knife, a lever connected to the guard for retracting the same, a spring for returning the guard to its normal position, a ratchet-bar, and a pawl coacting with the ratchet and for automatically locking the guard when returned to its normal position.

10. In a harvester having a cutting-knife, a movable guard normally in advance of the knife, and means for locking the guard in its advanced position.

11. In a harvester, in combination, a hinged cutting-knife and a hinged guard normally in advance of the knife, and means for retracting the guard.

12. In a harvester, in combination, a hinged knife and a hinged guard normally in advance of the knife, means for retracting the guard, and means for restoring the guard to its normal position upon the release of the retracting means.

13. In a harvester, in combination, a hinged knife and a hinged guard normally in advance of the knife, a lever having a connection with the guard for retracting the same, and a spring for restoring the guard to its normal position upon the release of the retracting means.

14. In a harvester, in combination, a carrying-platform, a cutting-knife hinged to the side of the platform, a rearwardly-movable guard also hinged to the platform and normally projecting in advance of the knife, a connection for retracting the guard, and a spring for advancing the guard to its normal position upon the release of the retracting connection.

15. In a harvester, in combination, a carrying-platform, a longitudinally-slidable oscillatable rod mounted on the platform, a cutting-knife fixed to the rod, a leaf pivoted on the rod and having its forward edge normally in advance of the cutting edge of the knife, a lever for sliding the rod, and a spring for returning the rod upon the release of the lever.

EDMUND K. REA

Witnesses:
ARTHUR B. SEIBOLD,
LOUIS K. GILLSON.